United States Patent
Townend

[11] Patent Number: 5,927,795
[45] Date of Patent: *Jul. 27, 1999

[54] VEHICLE AERODYNAMIC STABILITY DEVICE

[76] Inventor: Lionel Henry Townend, 3 Hawkley Hurst, Hawkley, NearLiss, United Kingdom, GU 336NS

[*] Notice: This patent issued on a continued prosecution application filed under 37 CFR 1.53(d), and is subject to the twenty year patent term provisions of 35 U.S.C. 154(a)(2).

[21] Appl. No.: 08/428,177
[22] PCT Filed: Jul. 18, 1994
[86] PCT No.: PCT/GB94/01545
  § 371 Date: May 11, 1995
  § 102(e) Date: May 11, 1995
[87] PCT Pub. No.: WO95/02532
  PCT Pub. Date: Jan. 26, 1995

[30] Foreign Application Priority Data
Jul. 17, 1993 [GB] United Kingdom .................. 9314820

[51] Int. Cl.[6] .......................................................... B60J 1/00
[52] U.S. Cl. ......................................... 296/180.1; 180/903
[58] Field of Search ................................. 296/180.1, 208; 180/903

[56] References Cited

U.S. PATENT DOCUMENTS
1,871,396 8/1932 Stalker ................................. 296/180.1
4,441,752 4/1984 Buehrig .............................. 296/180.1

FOREIGN PATENT DOCUMENTS
0 467 523 A2 1/1992 European Pat. Off. .
60-188684 7/1959 Japan .

Primary Examiner—Joseph D. Pape
Attorney, Agent, or Firm—Kelly & Hulme, P.C.

[57] ABSTRACT

A vehicle body has one or more aerodynamic devices mounted on each side of the vehicle afterbody so that a gap exists between each device and the adjacent body side which may be boattailed and/or recessed so as to accomodate the device and to permit a substantial airflow between the device and the vehicle body side and to provide a gap from which that flow is discharged downstream. The device may additionally or instead take the form of spats around the rear wheels of a road vehicle, or as additions to the spats.

6 Claims, 8 Drawing Sheets

VEHICLE AERODYNAMIC STABILITY DEVICE

BACKGROUND OF THE INVENTION

This invention relates to the reduction of hazard and/or driver fatigue resulting from crosswinds by means of directional control and stability devices on a vehicle body.

Vehicle operation in a crosswind can give rise to the vehicle body turning "out of wind" (i.e. the nose or bows of the vehicle body moves laterally in the same direction as the crosswind is blowing). This is because the crosswind creates a region of high suction on the leeward side of the vehicle, and/or of raised pressure on the windward side, and because the regions of highest suction usually occur over the front 20% of the vehicle body length.

A vehicle such as an automobile may well continue on its intended path, but to the driver, the lateral movement of the front of the vehicle will give rise to the impression that the vehicle is veering off-course. This can lead to driver fatigue and/or to the driver making unwarranted steering corrections which are in fact unnecessary and can cause hazard to his own vehicle or to others.

It is known that the addition of a more or less upright or vertical fin (or fins) on top and at the rear of a vehicle can produce a reduction in the tendency to turn out of wind, but such fins are visually obtrusive, structurally weak (being encastre at only one end) and they can impose roll on a vehicle in the course of applying the required lateral force (s)—and they will usually increase vehicle drag at any wind condition.

This patent describes an approach by which the effect of front end pressure and suction forces can be at least partly countered by forces produced near the tail or stern of the vehicle, and by means which are not only unobtrusive but which may also provide a reduction in vehicle aerodynamic drag.

SUMMARY OF THE INVENTION

According to the present invention, there is provided an aerodynamic stability device for a vehicle comprising one or more aerodynamic surfaces mounted in a generally upright position adjacent to and spaced from a side of the vehicle afterbody to provide a gap between each aerodynamic surface and the adjacent side of the vehicle through which a substantial airflow can occur, in which the airflow is taken at least in part from the airflow passing over the vehicle surface, and is discharged from the gap to flow adjacent to, or to form a part of, either or both of the vehicle baseflow or the vehicle wakeflow.

The aerodynamic surfaces are mounted in a generally upright position, i.e. they are mounted so that the leading edges of the aerodynamic surfaces are substantially vertical or generally parallel to the side of the vehicle but they may also be inwardly or outwardly inclined from the vertical along part or the whole of the aerodynamic surface, for example to meet aesthetic or constructional requirements of a particular vehicle design.

The aerodynamic surfaces are mounted so as to be generally perpendicular to the airflow, but they may be forwardly or rearwardly swept along part or the whole of the leading and/or trailing edges of the aerodynamic surface, for example to meet aesthetic or constructional requirements of a particular vehicle design.

The aerodynamic surfaces are mounted on the vehicle afterbody, i.e. on the rearmost half of the vehicle body, preferably on the rearmost third of the vehicle body and may extend or start downstream of the vehicle body.

The aerodynamic surfaces can be mounted directly to and spaced from the side of the vehicle and may be attached to the side of existing vehicles. In addition or alternatively the side of the vehicle may be recessed so as to form a channel or trough in the side of the vehicle body adjacent to the aerodynamic surface. Recessing the vehicle body adjacent to the aerodynamic surfaces enables the provision of a gap between the aerodynamic surface and the vehicle body sufficient to allow a substantial airflow through the gap without the need for the aerodynamic surface to project substantially out beyond the plane of the vehicle body. Recessing the vehicle body may provide advantages both in appearance and effectiveness of the device. The aerodynamic surface and recessed side of the vehicle can be profiled to achieve enhanced performance in terms of improved stability or reduced drag or both. In a preferred embodiment described hereinafter the vehicle is also profiled to have a boattail configuration, that is the vehicle is tapered in the downstream direction so that the vehicle cross-section and width diminishes towards the vehicle baseplane.

The gap between the aerodynamic surface and the vehicle body must be large enough to allow an airflow passing over the outer face of the aerodynamic surface and another through the gap between the aerodynamic surface and the vehicle body that are sufficient to generate the required lateral force or loading.

The airflow passing through the gap between the aerodynamic surface and the vehicle body can be taken entirely from the airflow passing over the surface of the vehicle. In an alternative embodiment the airflow passing through the gap may additionally be taken from other sources, (for example from the vehicle ventilation system provided that such air is of sufficiently high energy).

The airflow passing through the gap is discharged from the gap into or along the edges of the vehicle baseflow, that is the flow immediately adjacent to the vehicle's rearward extremities and downstream of those extremities and/or into the vehicle wakeflow, that is the flow surrounding the baseflow and extending down stream of the vehicle itself. In one embodiment described herein after the airflow is discharged from the gap adjacent to the base and sides of the vehicle.

It is recognised that the addition of the aerodynamic surfaces to a vehicle without either or both boattailing or recessing the sides can also be effective, but the preferred design uses both boattailing and recessing on the grounds of appearance and effectiveness and safety.

On a conventional vehicle, such as a road car, operating in a crosswind the resultant lateral force will act on the vehicle at a point usually about 20 to 25% rearward of the front of the vehicle body. The nearer to this front of the vehicle that a given resultant lateral force acts the greater the "turning out of wind" effect of the crosswind will be and conversely if the position at which a given resultant lateral force acts is moved rearwardly the less "turning out of wind" effect the crosswind will have on the vehicle. A rearward shift of only a few percent of the vehicle body length of the position at which the resultant lateral force acts on the vehicle body can produce a significant improvement in the behaviour of the vehicle in a crosswind. By use of the aerodynamic stability device according to the present invention it is possible to move rearwardly the position at which the resultant lateral force acts typically by 5% or greater of the length of the vehicle body.

The lateral force provided by the aerodynamic surfaces may be altered by changing the degree of camber or sweep of the aerodynamic surfaces. The lateral force provided by the aerodynamic surfaces may be increased by increasing the size of the aerodynamic surfaces or using a plurality of the devices. The greater the lateral force provided by aerodynamic surfaces at a given location the more the point on the vehicle body at which the resultant lateral force acts will be moved rearwardly.

The aerodynamic surfaces may be uncambered or cambered to have a finlike or winglike airfoil profile, and may carry or be operated in conjunction with, such additional devices as slatted leading edges, leading edge (vortex) flaps or trailing edge flaps, as may be found appropriate for such purposes as increasing rear-end side force in crosswinds, reducing associated drags in and/or out of crosswinds, reducing overall vehicle drag in and/or out of crosswinds, and/or for influencing the extent to which flows may remain attached to (rather than undergoing aerodynamic separation from) the surfaces of the vehicle and its associated features including the aerodynamic surfaces themselves.

In this connection, it is recognised that, in certain cases, separation of the flow may be deliberately provoked by the use of sharp leading edges or surface profiling such as ridges, but it is anticipated that attached flows will be more desirable and in order to ease the achievement of attached flows, leading edges are taken herein to be blunt or rounded.

The aerodynamic surfaces will usually be deployed in one or more pairs with one member of each pair on each side of the vehicle. In certain applications, it is recognised that a specialist vehicle may operate (continuously or otherwise) in crosswind(s) from only one side and that a single aerodynamic surface and/or some lack of vehicle symmetry may be acceptable and more appropriate to such vehicle(s). It is also recognised that, in certain applications, the relative effectiveness as between one or the other of a pair of the aerodynamic surfaces or fins will vary with operating condition and that one or both can (in principle and in practice) be of variable geometry perhaps under manual or "active" control.

The present invention is applicable to any vehicle which is susceptible to crosswinds. Such vehicles include, but are not limited to, cars, vans, motorcycles, lorries and other road vehicles and including trailers or caravans which may be towed by such vehicles and therefore be considered to form part of the vehicle such as the trailer of an articulated lorry. The present invention is also applicable to other vehicles such as speed or power boats, hydrofoil craft, hovercraft or magnetically levitated vehicles.

BRIEF DESCRIPTION OF THE DRAWINGS

Specific embodiments of the invention will now be described by way of example with reference to the accompanying drawings in which.

DETAILED DESCRIPTION OF THE INVENTION

Figure 1:
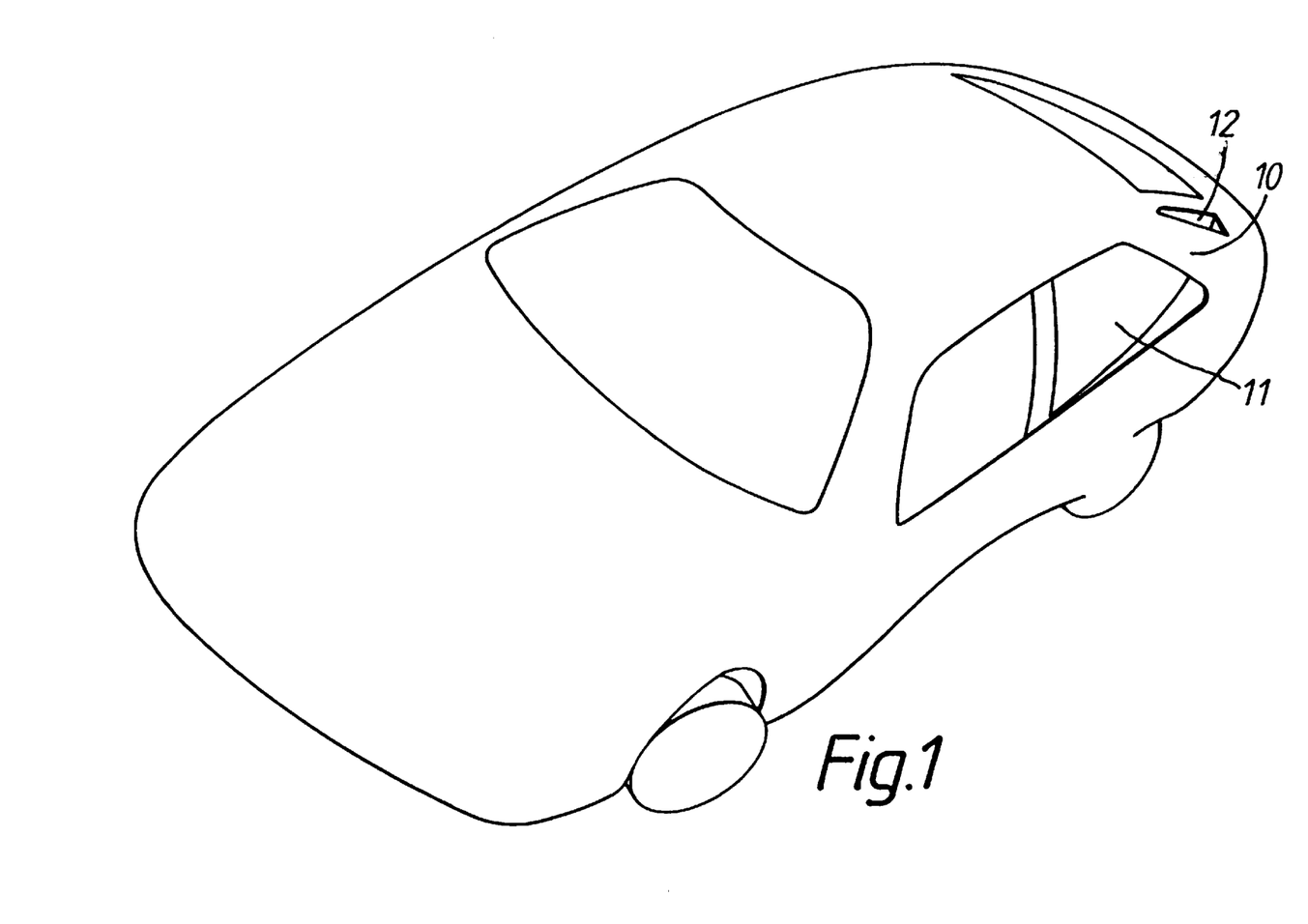
FIG. 1 shows in perspective the use of fins and a degree of boattailing and recessed sides on a vehicle of mainly orthodox appearance.
Figure 2:
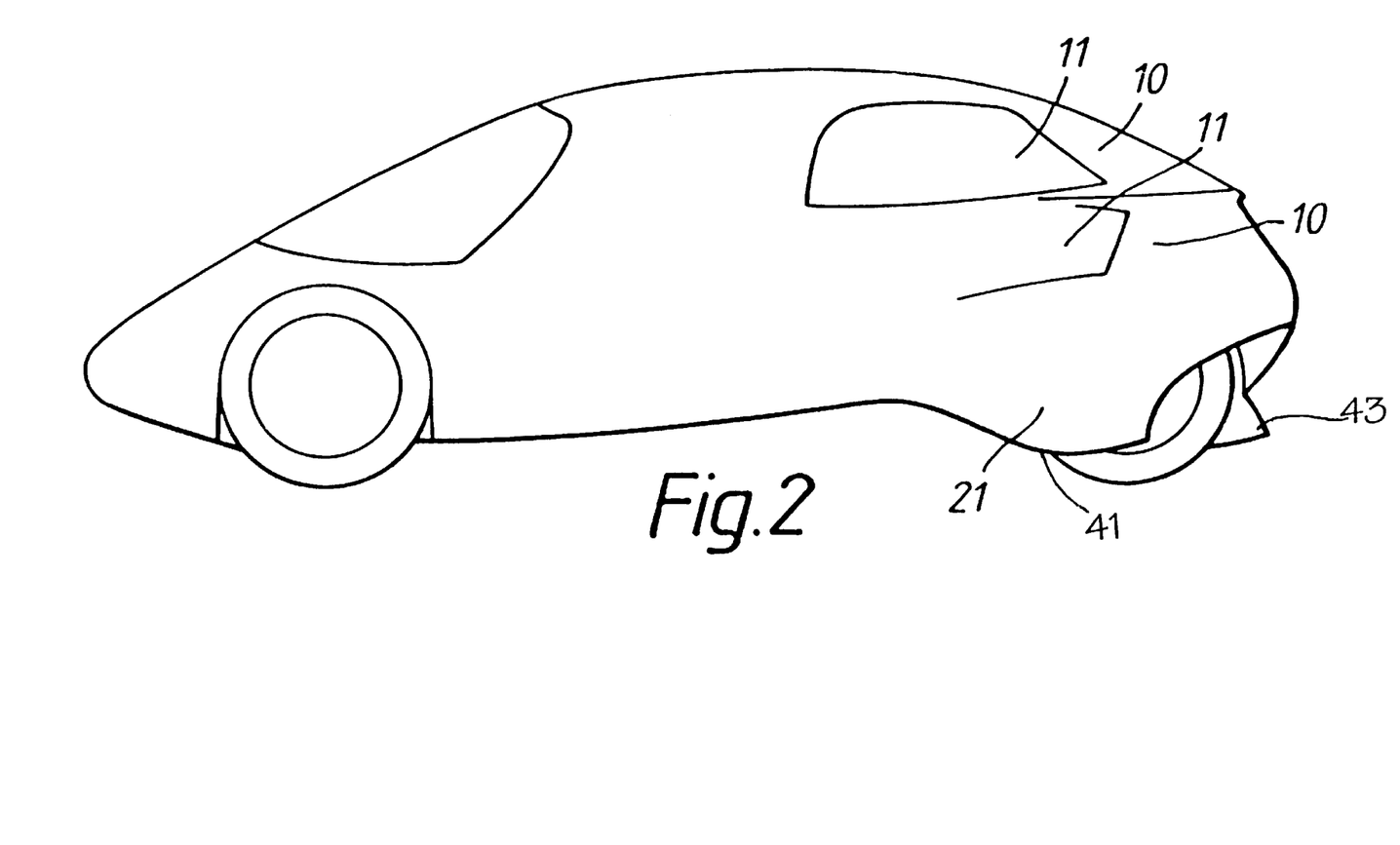
FIG. 2 shows drawings of a vehicle in which the further application of the invention now includes doubling the number of fins together with spatting of the rear wheels, and reprofiled sills to increase the depth of the spats and/or to permit airflow from one side or the other to flow more readily beneath the vehicle and thereby to the inner faces of the spats.
Figure 3A:
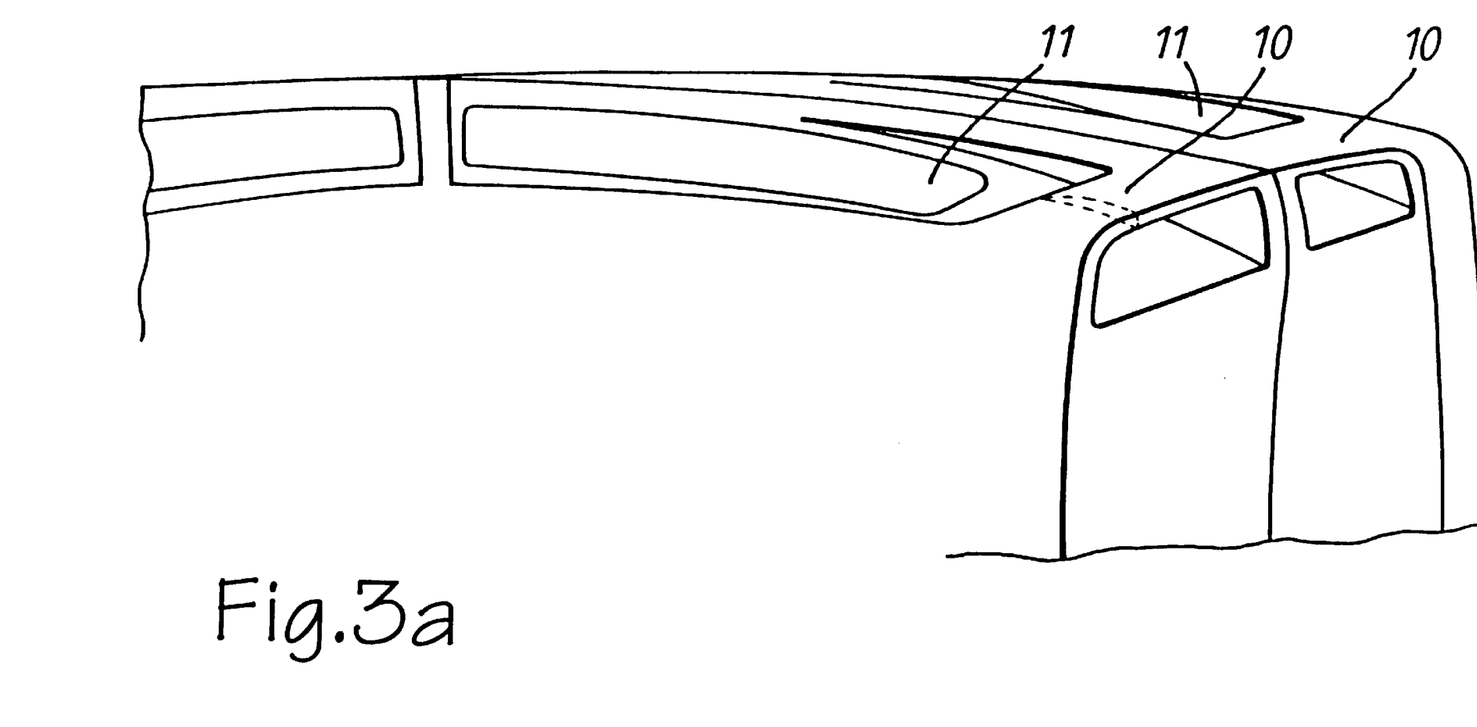
FIG. 3a shows a top view of a car such as that of FIG. 2 having fins that are uncambered.
Figure 3B:
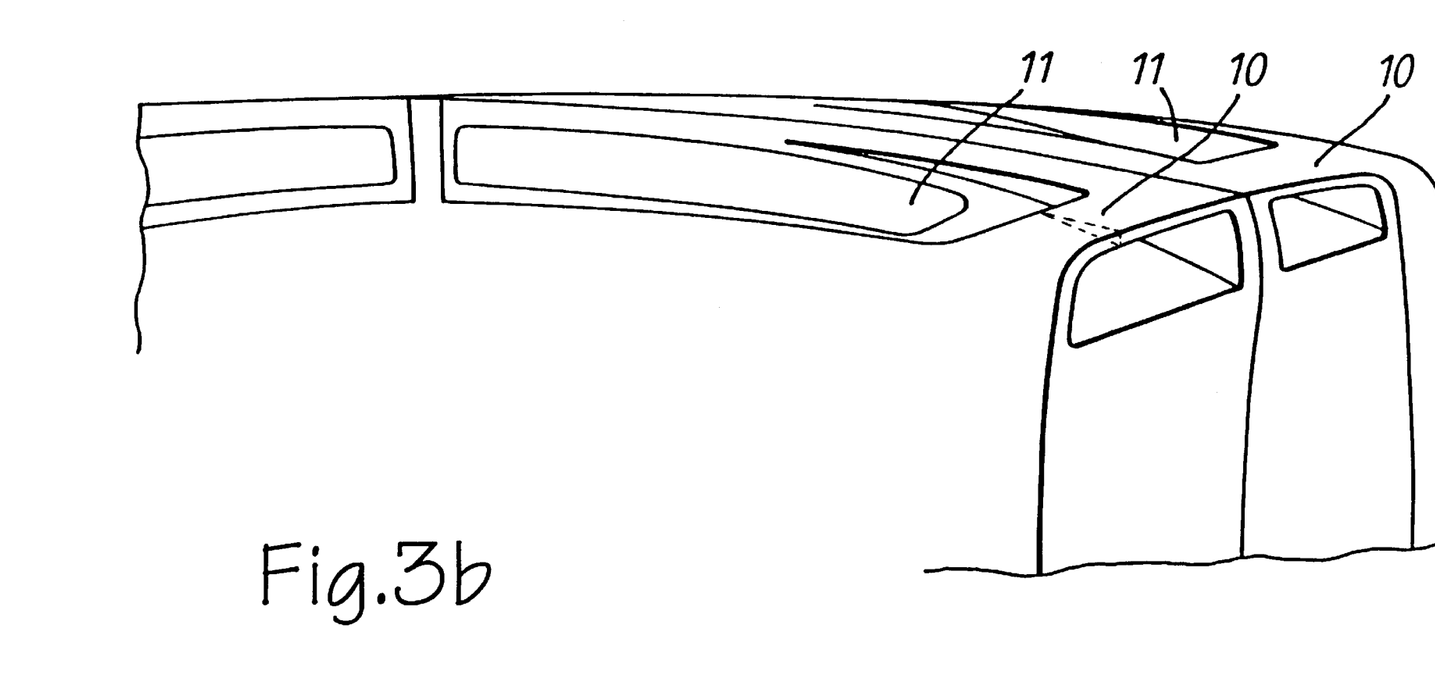
FIG. 3b shows a top view of a car such as that of FIG. 2 having fins that are uncambered.
Figure 3C:
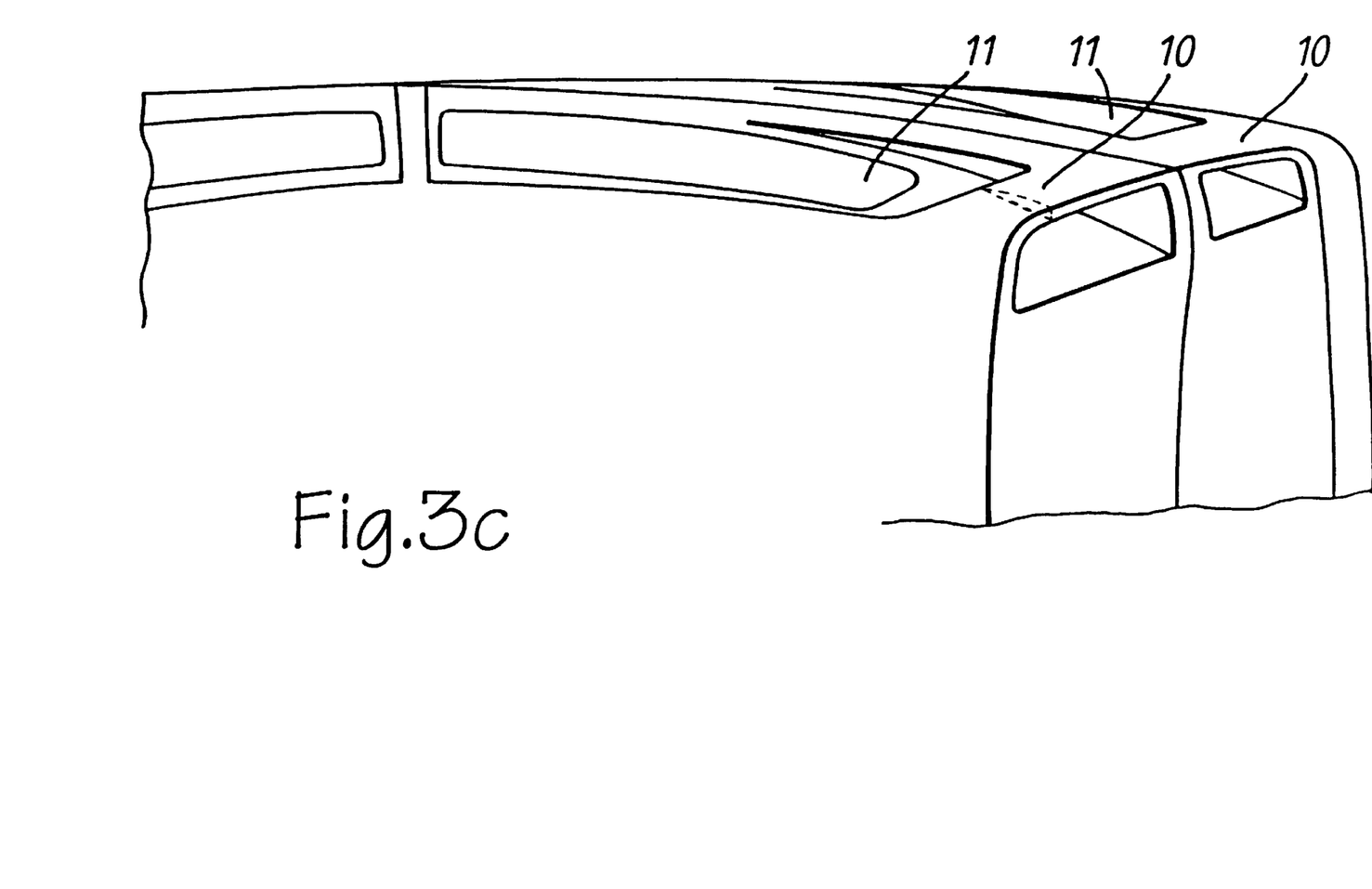
FIG. 3c shows a top view of a car such as that of FIG. 2 having fins with sharp leading edges.
Figure 3D:
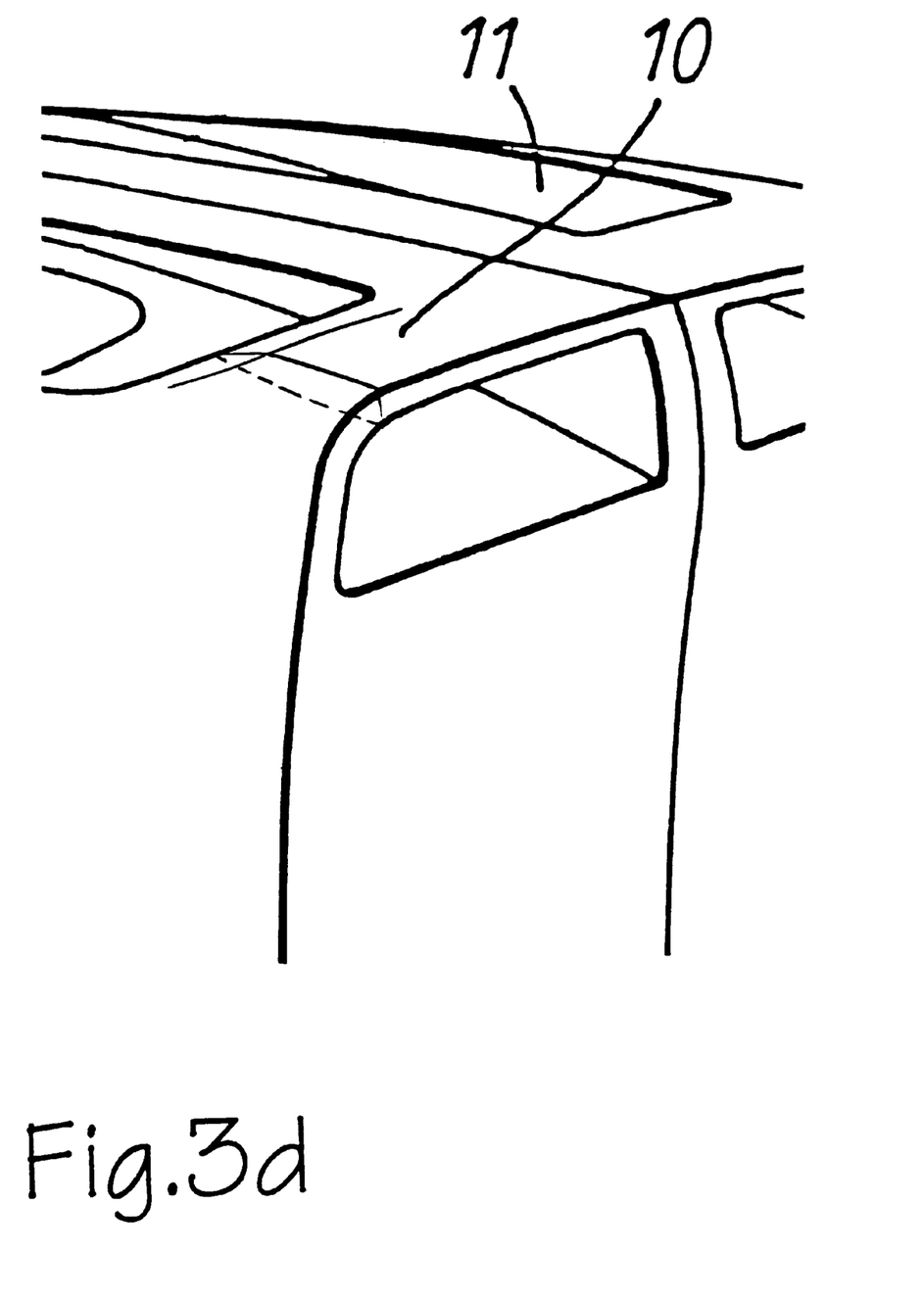
FIG. 3d shows a partially enlarged top view of a car as shown in FIG. 3c having fins with sharp leading edges and a surface ridge.
Figure 3E:
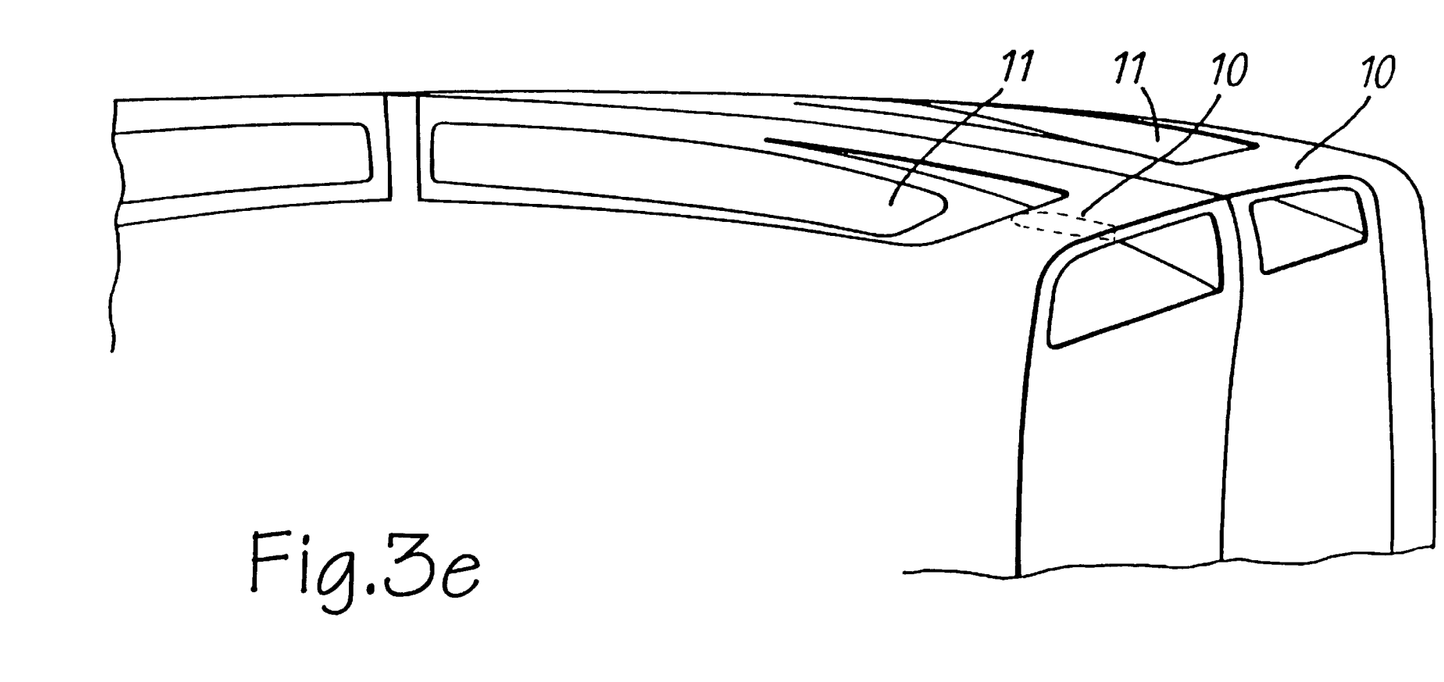
FIG. 3e shows a top view of a car such as that of FIG. 2 having fins with rounded leading edges.
Figure 3F:
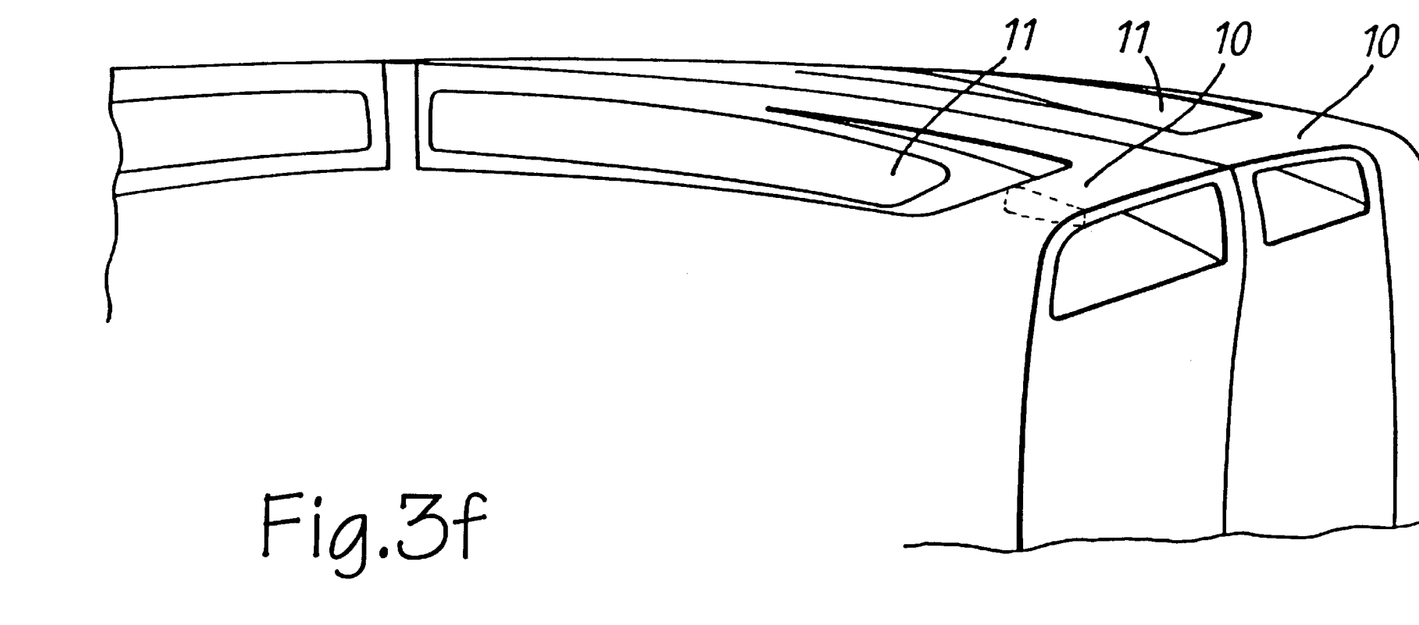
FIG. 3f shows a top view of a car such as that of FIG. 2 having fins with blunt leading edges.

Referring to the drawing, the car body comprises a conventional front end with aerodynamic surfaces or fins 10, 10 one on either side of the rear end which is recessed and boattailed in regions 11, 11 and thereby provides a gap 12 between each fin 10 and each adjacent side 11 of the vehicle. The wheel spats 21, at the rear end of the vehicle can be of symmetrical section or cambered nose-in 41 or cambered nose-out 42.

It is recognised that if one or both pairs(s) of fin(s) and/or the spats are correctly located and cambered, or if they are provided with additional devices such as slats or flaps, then the wake flow, base flow and base pressures on the vehicle may be favourably influenced, in the sense that the vehicle aerodynamic drag may fall. In particular, with the use of appropriate camber and with the correct incidence on the surfaces, a reduction in the aerodynamic drag relative to that of the unmodified vehicle may become possible.

I claim:

1. An aerodynamic stability device for a vehicle having side surfaces and a base surface, motion of the vehicle generating side surface airflow associated with the side surfaces of the vehicle, a baseflow associated with the base surface and regions immediately downstream of the base surface and a wakeflow at the rear and extending downstream of the vehicle, said stability device comprising one or more aerodynamic surfaces, the one or more aerodynamic surfaces, having an airfoil wing section profile with an inner face facing toward the adjacent side surface and an outer face facing outwardly from the adjacent side surface and mounted in a generally upright position adjacent to and spaced from one of the side surfaces of the vehicle on a rearmost portion of the vehicle to provide a gap between the aerodynamic surface and the adjacent side surface of the vehicles, a portion of the side surface airflow passing over the adjacent vehicle side surface and passing over the inner and outer faces of the aerodynamic stability device sufficient to generate a force normal to the direction of motion of the vehicle, the portion of the side surface airflow passing over the inner face of the device passing through the said gap to exit adjacent to, or to form part of either or both of the vehicle baseflow or the vehicle wakeflow.

2. A vehicle aerodynamic stability device as claimed in claim 1 wherein the side surface airflow passing over the aerodynamic stability device and through the gap leaves the said gap adjacent to the base surface or side surface of the vehicle.

3. A vehicle aerodynamic stability device as claimed in claim 1 wherein the vehicle is either or both boat-tailed or recessed to accommodate the device and the side surface air flow through the said gap.

4. A vehicle aerodynamic stability device as claimed in claim 1 wherein the device is cambered or uncambered.

5. A vehicle aerodynamic stability device as claimed in claim 1 having a forward facing leading edge which faces into the side surface airflow when the vehicle is in forward motion the leading edge being sharp or said device having surface ridges whereby separation of that part of the side surface airflow passing over the aerodynamic stability device is deliberately provoked.

6. A vehicle aerodynamic stability device as claimed in claim 1 having a forward facing leading edge which faces into the side surface airflow when the vehicle is in forward motion the leading edge being rounded or blunt whereby separation from the device of that part of the side surface airflow passing over the aerodynamic stability device is deliberately prevented.

* * * * *